(12) United States Patent
Kohara et al.

(10) Patent No.: US 6,755,883 B2
(45) Date of Patent: Jun. 29, 2004

(54) PUNCH, POWDER PRESSING APPARATUS AND POWDER PRESSING METHOD

(75) Inventors: Seiichi Kohara, Osaka-fu (JP); Shinji Kidowaki, Osaka (JP)

(73) Assignee: Sumitomo Special Metals Co., Ltd., Osaka (JP)

(*) Notice: Subject to any disclaimer, the term of this patent is extended or adjusted under 35 U.S.C. 154(b) by 28 days.

(21) Appl. No.: 10/225,135

(22) Filed: Aug. 22, 2002

(65) Prior Publication Data

US 2002/0192484 A1 Dec. 19, 2002

Related U.S. Application Data

(62) Division of application No. 09/883,231, filed on Jun. 19, 2001, now Pat. No. 6,656,417, which is a division of application No. 09/551,392, filed on Apr. 18, 2000, now Pat. No. 6,332,932.

(30) Foreign Application Priority Data

Apr. 20, 1999 (JP) .......................................... 11-111723
Jun. 15, 1999 (JP) .......................................... 11-167581

(51) Int. Cl.$^7$ ............................... B22F 3/00; H01F 1/00
(52) U.S. Cl. ......................................... 75/245; 148/302
(58) Field of Search .............................. 75/245; 148/302

(56) References Cited

U.S. PATENT DOCUMENTS

| | | | |
|---|---|---|---|
| 4,672,346 A | 6/1987 | Miyamoto et al. | .......... 335/296 |
| 4,792,368 A | 12/1988 | Sagawa et al. | ............. 148/302 |
| 4,960,474 A | * 10/1990 | Nozawa et al. | ............. 148/302 |
| 5,144,735 A | 9/1992 | Stark | .......................... 29/732 |
| 5,345,129 A | 9/1994 | Molnar | ........................ 310/156 |
| 5,345,669 A | 9/1994 | Ziglet et al. | ................... 29/598 |
| 5,383,978 A | 1/1995 | Yamamoto et al. | .......... 148/101 |
| 5,424,591 A | 6/1995 | Kuriyama | ..................... 310/12 |
| 5,448,437 A | 9/1995 | Katahara | ..................... 360/106 |
| 5,672,363 A | * 9/1997 | Sagawa et al. | ................. 425/3 |
| 6,413,457 B1 | * 7/2002 | Fukushima et al. | ......... 264/109 |

FOREIGN PATENT DOCUMENTS

| | | |
|---|---|---|
| DE | 38 85 980 T2 | 9/1987 |
| JP | 5-239505 | 9/1973 |
| JP | 59-37724 | 3/1984 |
| JP | 59-166601 | 9/1984 |
| JP | 62-40050 | 2/1987 |
| JP | 4-218903 | 8/1992 |
| JP | 7-70605 | 3/1995 |
| JP | 9-150298 | 6/1997 |
| JP | 9-327813 | 12/1997 |
| JP | 10-15696 | 1/1998 |
| JP | 2000-254907 | 9/2000 |

OTHER PUBLICATIONS

Notification of Reasons for Refusal to the corresponding Japanese Patent Application No. 2000–117574 (and translation thereof.) Dispatch No. 356181.
Office Action dated Jan. 27, 2003 to the corresponding German Application No. 10019831.7 and English translation thereof.
Office Action dated Aug. 14, 2002; U.S. Ser. No. 09/883, 231.
Office Action dated Nov. 14, 2003, along with translation.

* cited by examiner

*Primary Examiner*—Ngoclan Mai
(74) *Attorney, Agent, or Firm*—Armstrong, Kratz, Quintos, Hanson & Brooks, LLP.

(57) ABSTRACT

A powder pressing apparatus comprises a die having a through hole, an upper punch and a lower punch. At least one of the upper and lower punches has a punching surface having an edge portion provided with a projection. The projection has a tip chamfered by a width not greater than 0.5 mm. The punching surface has a slope having a surface roughness Ra not greater than 1.0 μm. A rare-earth alloy powder is fed into a cavity formed in the through hole of the die. The rare-earth alloy powder in the cavity is oriented by magnetic field, and pressed by using the upper and lower punches. The upper punch and the lower punch are brought closest to each other at a minimum distance not smaller than 1.7 mm during the pressing. An obtained compact is used for manufacture of a sintered body and a voice coil motor.

12 Claims, 16 Drawing Sheets

F I G. 1 1
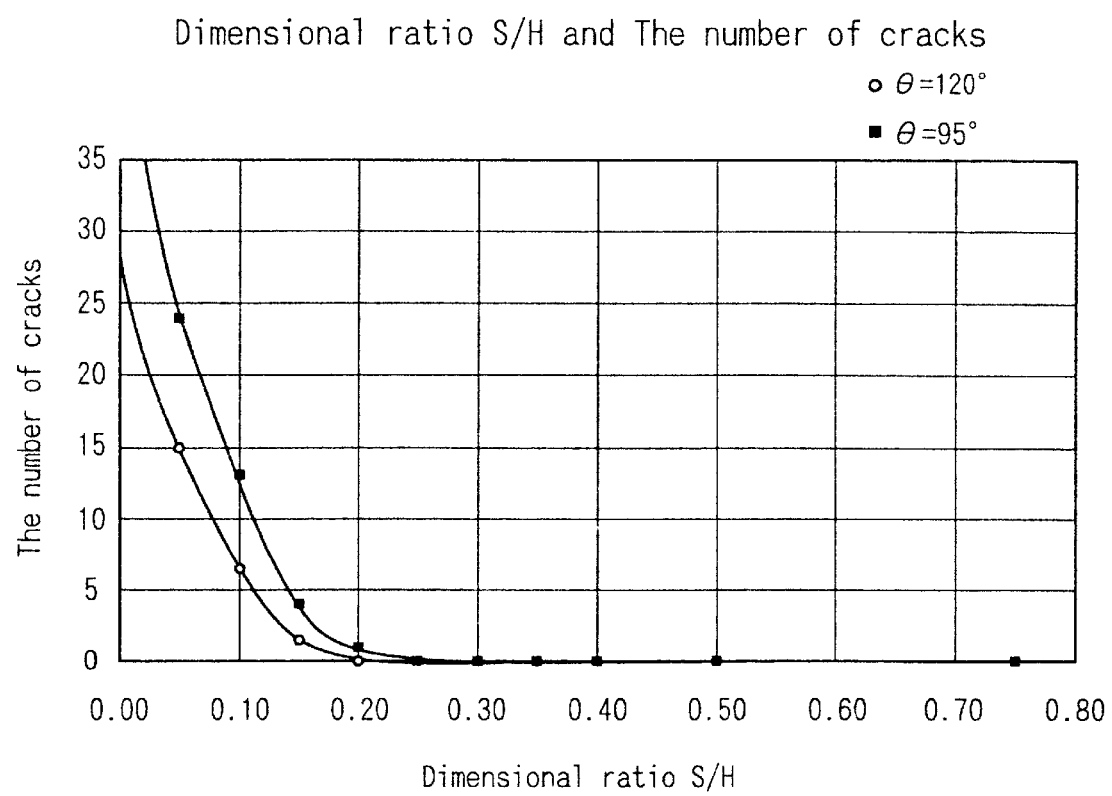

PUNCH, POWDER PRESSING APPARATUS AND POWDER PRESSING METHOD

This application is a divisional application of prior application Ser. No. 09/883,231 filed Jun. 19, 2001 U.S. Pat. No. 6,656,417, which is a divisional application of prior application Ser. No. 09/551,392 filed Apr. 18, 2001 U.S. Pat. No. 6,332,932.

BACKGROUND OF THE INVENTION

1. Field of the Invention

The present invention relates for example to a punch for pressing a powder such as a rare-earth alloy powder into a compact, for manufacture of a magnet used in a voice coil motor, a powder pressing apparatus and a powder pressing method using the above punch, a compact formed by such a pressing method as above, a sintered body and a voice coil motor using the sintered body.

2. Description of the Related Art

Referring to FIG. 14 and FIG. 15, description will cover a conventional method for pressing the rare-earth alloy powder into a compact 8 (see FIG. 16). The compact 8 is sintered and then used as a magnet for the voice coil motor and so on.

In order to manufacture the compact 8, a tolling 1 for pressing operation as shown in FIG. 14 is used. The tolling 1 includes a die 3 having a through hole 2, a lower punch 4 to be inserted into the through hole 2 in advance, and an upper punch 5 to be inserted into the through hole 2. The lower punch 4 is provided with an upper surface having a center portion formed with a generally arcuate projection 4a and two edge portions each formed with a flange-like projections 4b. The upper punch 5 has a lower surface formed with a recess 5a. Each of the lower punch 4 and the upper punch 5 is made of a hard alloy such as cemented carbide, and for protection from chipping and cracking, each tip of the projection 4b and an edge portion 5b is chamfered by 0.8 mm.

When pressing, first, the lower punch 4 is lowered to form a cavity 6 in the through hole 2, and the cavity 6 is fed with a rare-earth alloy powder 7.

Then, the rare-earth alloy powder 7 in the cavity 6 is pressed between the lower punch 4 and the upper punch 5 while being oriented by a magnetic field. The pressing operation to the rare-earth alloy powder 7 is continued until the two edge portions 5b of the upper punch 5 are about to contact the corresponding projections 4b of the lower punch 4 (until a gap between the punches becomes about 1 mm for example) as shown in FIG. 15 in order to form a shape as close as of a final product.

As a result, a compact 8 as shown in FIG. 16 is obtained.

The compact 8 is formed to have a generally arcuate section, including an upper surface 8a formed by the recess 5a of the upper punch 5, a lower surface 8b formed by the projection 4a of the lower punch 4, slopes 8c formed by the projection 4b of the lower punch 4, and end surfaces 8d formed by a wall of the through hole 2.

As shown in FIG. 16, the compact 8 has a problem that cracks A develop along border portions 8e between the upper surface 8a and the slope 8c.

Causes of the crack A will be described.

As shown in FIG. 14, when the rare-earth alloy powder 7 is fed into the cavity 6, layers of a marking material B having a color different from that of the rare-earth alloy powder 7 were inserted at a predetermined interval, and then the pressing operation was made. Then, as shown in FIG. 15, the gap between layers of the marking material B was found to be very narrow between the projection 4b of the lower punch 4 and the edge portion 5b of the upper punch 5. This indicates that the rare-earth alloy powder 7 has a much higher density between the projection 4b of the lower punch 4 and the corresponding edge portion 5b of the upper punch 5 than in other portions. This is presumably that when being pressed, the rare-earth alloy powder having a poor flowability was sandwiched between a tip of the projection 4b of the lower punch 4 and a tip of the edge portion 5b of the upper punch 5, became unable to move, and was compressed into such a high density at the border portion 8e. Therefore, pressure exerted to the compact 8 is relieved when the compact 8 is taken out of the through hole 2 of the die 3, allowing a highly compressed portion such as the border portion 8e to expand more significantly, often developing cracks or fractures. A similar problem occurs in a sintering process.

If the rare-earth alloy powder 7 is pressed in a strong magnetic field not smaller than 0.5 MA/m oriented in a direction indicated by an arrow C (longitudinally of the projection 4b) shown in FIG. 16, grains of the magnetized rare-earth alloy powder 7 repel against each other, making the powder density higher in a region closer to a perimeter of the cavity 6 than in a center portion of the cavity 6, increasing further the density near the projection 4b. Further, if the rare-earth alloy powder 7 fed into the cavity 6 is wiped flush at an upper edge of the cavity 6 by a lower edge of feeder box (not shown), region to be pressed by the projection 4b is fed with an excess amount of the rare-earth alloy powder 7 than needed. Since the rare-earth alloy powder 7 does not have enough flowability, the density in this region after the pressing becomes higher than in other regions. Therefore, in these cases, the compact 8 becomes more apt to develop the cracks or fractures in the border portion 8e when taken out of the cavity 6.

SUMMARY OF THE INVENTION

It is therefore a primary object of the present invention to provide a punch, a powder pressing apparatus and a powder pressing method capable of preventing the cracks and fractures from developing in the product, thereby improving productivity.

Another object of the present invention is to provide a compact manufactured by the above method.

Still another object of the present invention is to provide a sintered body and a voice coil motor using the sintered body.

According to an aspect of the present invention, there is provided a punch used for pressing a rare-earth alloy powder, comprising a punching surface for pressing the rare-earth alloy powder. The punching surface has an edge portion including a projection having a tip chamfered by a width not greater than 0.5 mm.

According to another aspect of the present invention, there is provided a powder pressing apparatus comprising the above described punch having the tip chamfered by the width not greater than 0.5 mm, and a die having a through hole for insertion by the punch.

According to another aspect of the present invention, there is provided a powder pressing method using the above punch having the tip chamfered by the width not greater than 0.5 mm and a die having a through hole for insertion by the punch. The method comprises a first step of feeding a rare-earth alloy powder into a cavity formed in the through hole, and a second step of pressing the rare-earth alloy powder fed into the cavity, by using the punch.

According to still another aspect of the present invention, there is provided a compact manufactured by the above described powder pressing method.

The rare-earth alloy powder has a sharp-edged grain, and has poor flowability. Therefore, even if the rare-earth alloy powder is vibrated for example at the time of pressing, the rare-earth alloy powder cannot move smoothly in the cavity during the pressing, making difficult to achieve uniformity of the compact density. However, according to the present invention, by decreasing the width of the chamfered portion, which is a portion formed at the tip of the projection provided at the edge portion of the punching surface, to 0.5 mm or smaller, thereby reducing the amount of the rare-earth alloy powder pressed and clogged by the edge portions, the flowability of the rare-earth alloy powder around the edge portion is improved. Therefore, when a pressing force is applied to the rare-earth alloy powder at the tip of the projection of the punching surface at the time of pressing, the rare-earth alloy powder moves to a region of a lower density along the slope of the projection, without stagnating at the tip of the projection. Therefore, it becomes possible to obtain a compact having a uniform density, making possible to prevent the cracks and fractures caused by the non-uniform density.

According to an aspect of the present invention, there is provided a punch used for pressing a rare-earth alloy powder, comprising a punching surface for pressing the rare-earth alloy powder. The punching surface includes a projection, and the projection includes a slope having a surface roughness Ra not greater than 1.0 μm.

According to another aspect of the present invention, there is provided a powder pressing apparatus comprising the above described punch provided with the slope having the surface roughness Ra not greater than 1.0 μm and a die having a through hole for insertion by the punch.

According to another aspect of the present invention, there is provided a powder pressing method using the above punch provided with the slope having the surface roughness Ra not greater than 1.0 μm and a die having a through hole for insertion by the punch. The method comprises a first step of feeding a rare-earth alloy powder into a cavity formed in the through hole, and a second step of pressing the rare-earth alloy powder fed into the cavity, by using the punch.

According to still another aspect of the present invention, there is provided a compact manufactured by the above described powder pressing method.

According to the present invention, by making the slope roughness Ra not greater than 1.0 μm, it becomes possible to increase the flowability of the rare-earth alloy powder at the time of pressing. Therefore, the rare-earth alloy powder being in a high-density region such as around the tip of the projection of the punching surface, moves along the slope to a low-density region. As a result, it becomes possible to increase uniformity in the density of the rare-earth alloy powder within the cavity. Therefore, it becomes possible to obtain the compact having a high uniformity of the density, making possible to prevent the cracks and fractures caused by the non-uniform density.

Preferably, the punching surface is made of an alloy steel or a hard alloy(cemented carbide). In this case, abrasion resistance of the punching surface can be improved. Therefore, even if the chamfering width of the tip of the projection is not greater than 0.5 mm or the surface roughness Ra of the punching surface is not greater than 1.0 μm for increased flowability of the rare-earth alloy powder, the punching surface is virtually free from wear, making possible to keep the good pressing.

Further, preferably, at least the projection in the punching surface has an HRA hardness not smaller than 75 and not greater than 93. In this case, even if the projection of the punching surface is machined into a sharp edge, the punch can be used for a long period of time without failure in the tip of the projection because of improved toughness.

The flowability becomes even more decreased if the rare-earth alloy powder is added with a lubricant. However, since the flowability of the rare-earth alloy powder can be increased according to the present invention, the uniformity of the powder density within the cavity can be increased even if the lubricant is added.

If the rare-earth alloy powder is manufactured by a quenching method, the flowability becomes extremely poor, since grain size distribution curve of the rare-earth alloy powder becomes sharp, with the grain size confined in a small range. However, since the flowability of the rare-earth alloy powder can be improved according to the present invention, the powder density uniformity within the cavity can be improved even if the rare-earth alloy powder is made by the quenching method.

Preferably, a compact after the pressing has a density of 3.90 g/cm$^3$~4.60 g/cm$^3$. In this case, necessary strength of the compact can be achieved, and a rare-earth magnet having a good magnetic characteristic can be obtained.

At the time of pressing, if the magnetic field is applied to the rare-earth alloy powder in the cavity, in a direction vertical to a direction of pressing by the punch, grains of the magnetized rare-earth alloy powder repel against each other, and the powder density tends to become higher in an region closer to a perimeter of the cavity than in a center region of the cavity. However, since the flowability of the rare-earth alloy powder on the punching surface can be improved according to the above invention, the rare-earth alloy powder in a high-density region moves to a low-density region. Therefore, difference in density of the rare-earth alloy powder within the cavity can be decreased even if the rare-earth alloy powder is oriented in the magnetic field.

Further, if the rare-earth alloy powder is oriented in the magnetic field not smaller than 0.5 MA/m, the repelling force among the magnetized rare-earth alloy grains becomes larger, making the powder density distribution within the cavity non-uniform, making the density higher in a region closer to a perimeter of the cavity. However, according to the present invention, even if the magnetic orientation is made as above, the non-uniformity of density within the cavity and the increase in density near the perimeter of the cavity can be reduced, making possible to effectively reduce the cracks and fractures.

According to another aspect of the present invention, there is provided a powder pressing method using a tolling including a die having a through hole, and a pair of upper and lower punches. At least one of the upper and lower punches has a punching surface for pressing the rare-earth alloy powder, and the punching surface has an edge portion provided with a projection. The method comprises a first step of feeding the rare-earth alloy powder into a cavity formed in the through hole, and a second step of pressing the rare-earth alloy powder fed in the cavity, by using the upper and lower punches. In the second step, the upper punch and the lower punch are brought closest to each other at a minimum distance not smaller than 1.7 mm.

According to the present invention, the compact after the pressing can have a side surface of a width not smaller than 1.7 mm. Therefore, the cracks and fractures in the side surface of the compact can be reduced.

According to another aspect of the present invention, there is provided a compact made of a rare-earth alloy powder, comprising: a main surface formed convex; another main surface formed concave; a slope from an edge of said another main surface; and a side surface formed between said main surface and the slope. According to this compact, the side surface has a width not smaller than 1.7 mm. Or, said main surface has a maximum height H, the side surface has a width S, and S/H is not smaller than 0.15.

According to the present invention, the width of the side surface of the compact is not smaller than 1.7 mm. Or, the width of the side surface of the compact has a ratio not smaller than 0.15 to the height to the highest portion of said main surface. Therefore, it becomes possible to prevent extreme increase in the density in the side surface, making possible to reduce the difference in the density from other portions. As a result, the crack and fracture in the side surface of the compact can be reduced.

According to another aspect of the present invention, there is provided a sintered body made of a rare-earth alloy powder, comprising: a main surface formed convex; another main surface formed concave; a slope from an edge of said another main surface; and a side surface formed between said main surface and the slope. According to this sintered body, the side surface has a width not smaller than 1.45 mm. Or, said main surface has a maximum height H, the side surface has a width S, and S/H is not smaller than 0.15.

In this case, the compact at the time of the pressing is formed to have a width of a side surface not smaller than 1.7 mm. Or, the width of the side surface of the compact at the time of the pressing is formed to have a ratio not smaller than 0.15 to the height to the highest portion of said main surface. Therefore, the cracks and fractures in the side surface of the compact can be reduced. As a result, yield in the manufacturing process can be improved, and productivity of the sintered body can be improved.

According to another aspect of the present invention, there is provided a voice coil motor using the above sintered body.

The sintered body obtained as described above is less apt to develop such a failure as cracks and fractures. Therefore, by using such a sintered body, a voice coil motor of a stable quality can be obtained.

The above objects, other objects, characteristics, aspects and advantages of the present invention will become clearer from the following description of embodiments to be presented with reference to the accompanying drawings.

BRIEF DESCRIPTION OF THE DRAWINGS

FIG. 11 is a graph showing relationships between a dimensional ratio S/H and the number of cracks;

DETAILED DESCRIPTION OF THE PREFERRED EMBODIMENT

Embodiments of the present invention will be described here below with reference to the attached drawings.

Figure 1:
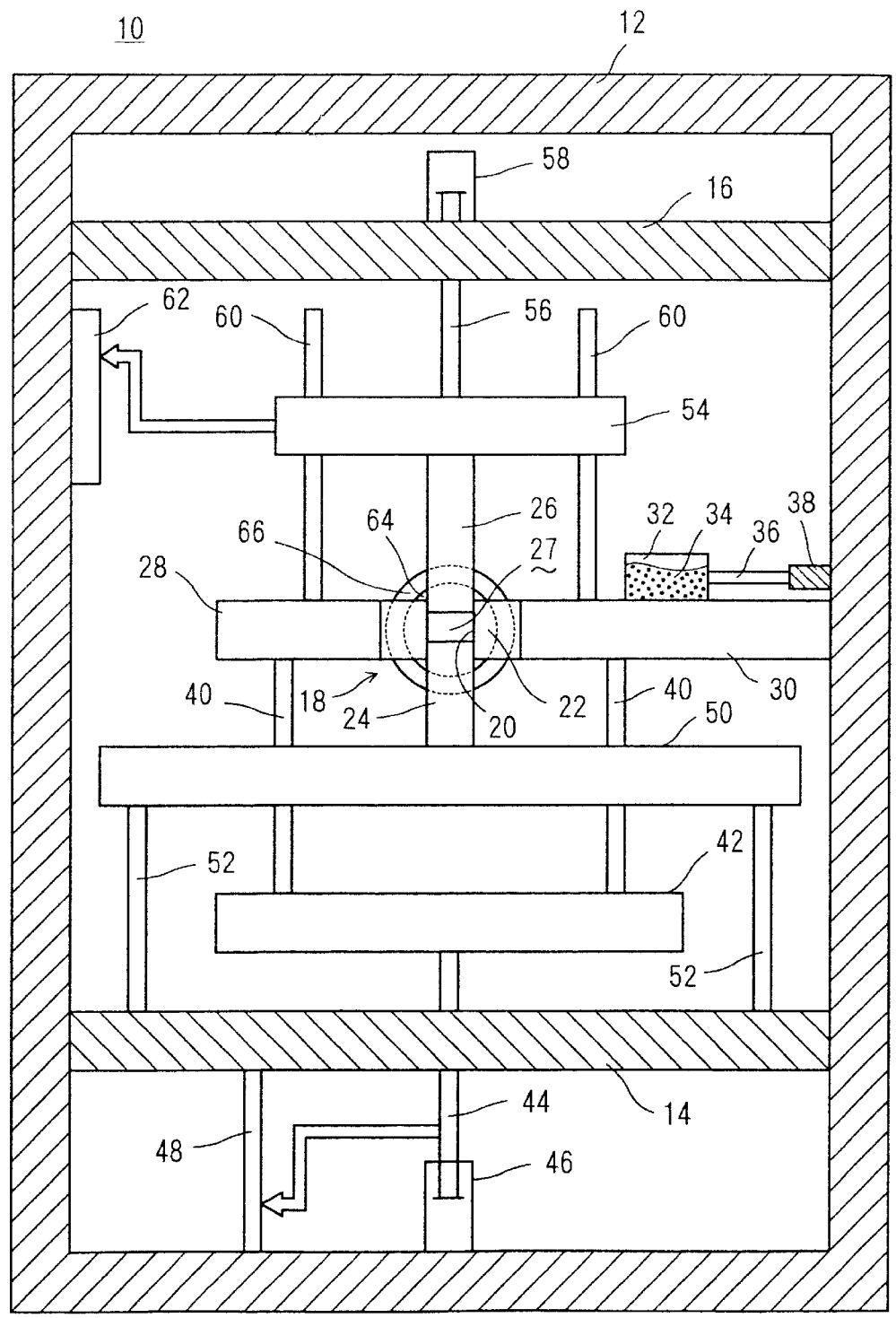
FIG. 1 is a schematic diagram showing a powder pressing apparatus as an embodiment of the present invention.

Referring now to FIG. 1, a powder pressing apparatus 10 as an embodiment of the present invention comprises a cage-like frame 12. At each of a lower and an upper portions inside the frame 12, there is disposed a punch fixing table 14 and a plate 16 in a horizontal direction.

Further, a tolling 18 for pressing is provided in the frame 12. The tolling 18 is used for forming a compact 88 (to be described later) for a rare-earth magnet used in a voice coil motor for example.

The tolling 18 includes a die 22 having a through hole 20, a lower punch 24 to be inserted into the through hole 20 in advance, and an upper punch 26 for insertion into the through hole 20. With this arrangement, a cavity 27 is formed in the through hole 20 of the die 22.

The die 22 is set to die setters 28, 30. The die setter 30 has an upper surface disposed with a feeder box 32. The feeder box 32 holds a rare-earth alloy powder 34. The feeder box 32 is linked to a hydraulic cylinder 38 via a cylinder rod 36. Therefore, the feeder box 32 is movable to and from the through hole 20 by the hydraulic cylinder 38.

Each of the die setters 28, 30 has a lower surface attached with a die setter connecting plate 42 via a guide post 40. The die setter connecting plate 42 is connected to a lower hydraulic cylinder 46 via a cylinder rod 44. Therefore, the die 22 and die setters 28, 30 are movable in the vertical directions by the lower hydraulic cylinder 46. An amount of extension of the cylinder rod 44, i.e. a position of the die 22 is measured by a linear scale 48, and the operation of the lower hydraulic cylinder 46 is controlled based on the measurement.

The lower punch 24 is provided on a base plate 50. The base plate 50 is disposed on the punch fixing table 14 via a post 52. The lower punch 24 is fixed with this arrangement.

The upper punch 26 has an upper end attached to an upper punch plate 54. The upper punch plate 54 is connected to an upper hydraulic cylinder 58 via a cylinder rod 56. The upper hydraulic cylinder 58 is disposed on the plate 16. Further, the upper punch plate 54 has two edge portions each penetrated by a guide post 60. Therefore, the upper punch plate 54 is movable vertically by the upper hydraulic cylinder 58 while being guided by the guide posts 60. An amount of extension of the upper punch plate 54, i.e. a position of the upper punch 26 is measured by a linear scale 62, and the operation of the upper hydraulic cylinder 58 is controlled based on the measurement.

Further, in order to orient the powder 34 fed in the cavity 27 by a magnetic field, a pair of pole pieces 64, and coils 66 wound around pole pieces 64 respectively are provided near the die 22.

In the powder pressing apparatus 10 as described above, attention should be paid to the upper punch 26 and the lower punch 24.

Each of the upper punch 26 and the lower punch 24 is made of a WC—Ni type of sintered hard alloy(cemented carbide) having an HRA hardness not smaller than 75 and not greater than 93, comprising typically 1.6 wt % Mo and 20 wt % Ni, with the rest being WC, for example. The term sintered hard alloy used herein refers to an alloy made by sintering the following powder mix. The powder mix comprises a powder made of a carbide comprising at least one element among nine elements belonging to groups IVa, Va, VIa of the periodic table of elements, and a powder of ferrous metal such as Fe, Co, Ni, Mo, and Sn or of an alloy made therefrom. The sintered hard alloy may alternatively be a WC—TaC—Co alloy, a WC—TiC—Co alloy or a WC—TiC—Tac—Co alloy.

Alternatively, the upper punch 26 and the lower punch 24 may be made of an alloy steel. The term alloy steel used herein refers to an alloy primarily made of Fe—C, and may be a high speed steel, a high manganese steel or a die steel and so on, if provided with the specified hardness.

By making the upper punch 26 and the lower punch 24 of the sintered hard alloy or an alloy steel having the HRA hardness of not smaller than 75 and not greater than 93, the toughness and a certain level of elasticity is achieved, and it becomes possible to prevent cracking and chipping even if the upper punch 26 and the lower punch 24 are machined to have a sharp portion.

Figure 2:
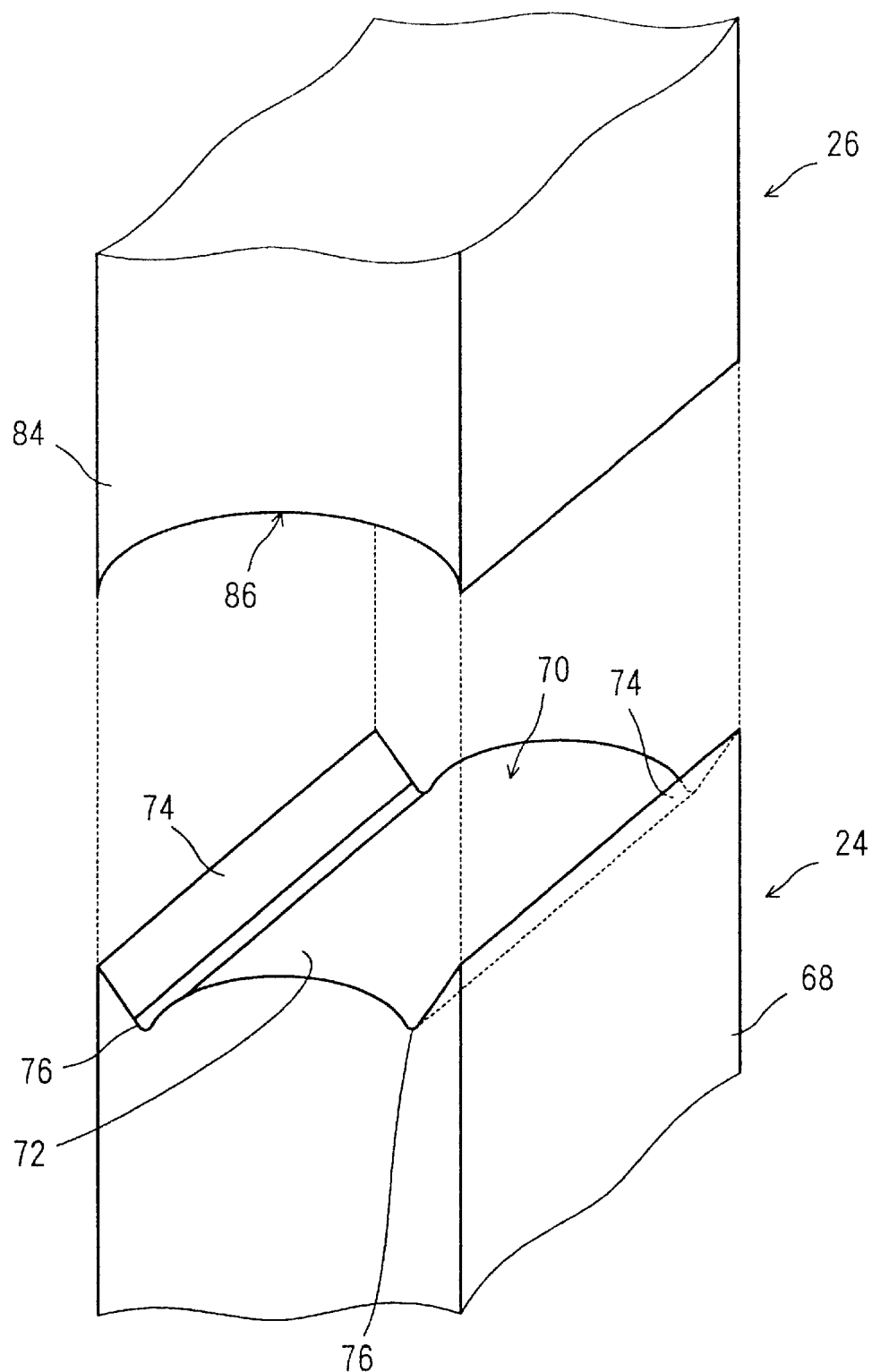
FIG. 2 is a perspective view showing a primary portion of upper and lower punches used in the embodiment in FIG. 1.

Referring now to FIG. 2, the lower punch 24 includes a lower punch main body 68. The lower punch main body 68 has an upper end formed with the punching surface 70 for pressing the powder 34. The punching surface 70 includes a generally arcuate projection 72 along a longitudinal centerline, and two sides each formed with a longitudinal flange-like projection 74. As a result, a longitudinal groove 76 is formed between the projection 72 and the projection 74.

Figure 3:
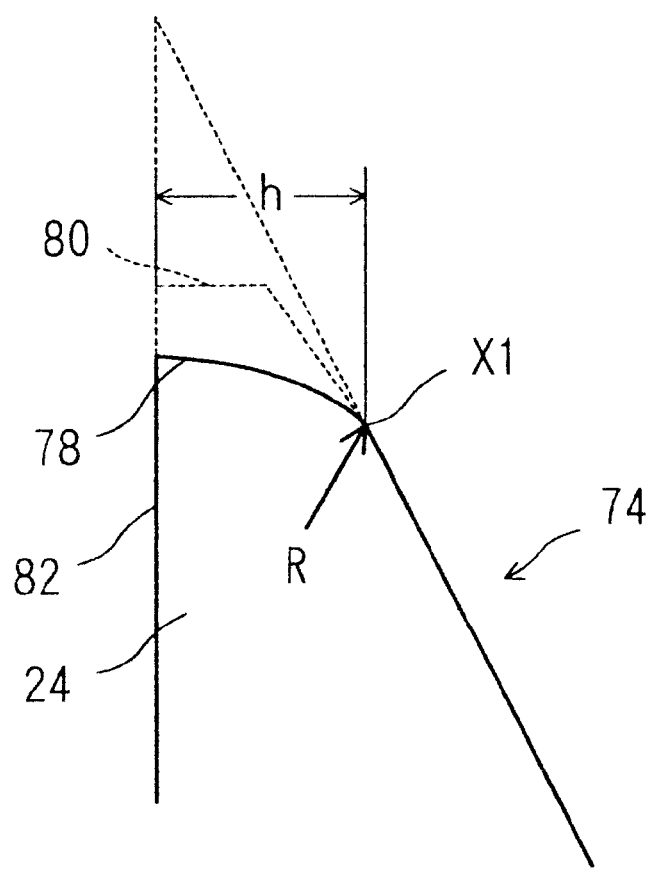
FIG. 3 is a side view showing a primary portion of a projection in a punching surface of the lower punch.

Referring further to FIG. 3, description will be made for a tip 78 of the projection 74.

The tip 78 of the projection 74 is chamfered. A broken line 80 shows a tip of the projection 74 before the chamfering operation. By chamfering the tip indicated by the broken line 80, the curved tip 78 having a radius R is formed. It should be noted here that the projection 74 is formed to have a slope, with a portion above a border X1 formed into a curved surface and a portion below formed into a flat surface. Further, the chamfering width h is defined as a minimum distance from the border X1 to a punch side surface 82. According to the present embodiment, the chamfering width h is not greater than 0.5 mm. Further, more preferably, the chamfering width h is not greater than 0.1 mm. From a view point of preventing failure, it is preferable that the chamfering width h is 0.02 mm~0.05 mm.

Referring back to FIG. 2, the upper punch 26 includes an upper punch main body 84. The upper punch main body 84 has a bottom end formed with a concave punching surface 86 for pressing the powder 34.

Further, the punching surface 86 of the upper punch 26 and the punching surface 70 of the lower punch 24 are treated to have a surface roughness Ra not greater than 1 $\mu$m.

According to the present embodiment, the surface treatment may be made only to a part of the projection 74 of the punching surface 70 so that the treated part has the surface roughness Ra not greater than 1 $\mu$m.

It should be noted here that if the upper punch 26 and the lower punch 24 are made of the alloy steel, the surface treatment may include TiN coating or diamond-like carbon (DLC) coating, thereby increasing durability against an Nd—Fe—B alloy powder which is highly abrasive. Further, the same surface treatment improves durability if the upper punch 26 and the lower punch 24 are made of the sintered hard alloy.

Still further, such a surface treatment as above can be applicable if the upper and lower punches 26, 24 are constituted vice versa.

The rare-earth alloy powder used as the powder 34 is manufactured as follows. Specifically, an ingot is made using a strip cast process as disclosed in the U.S. Pat. No. 5,383,978 as a quenching method.

More specifically, an alloy manufactured by a known method and having a composition comprising 30% Nd, 1.0% B, 1.2% Dy, 0.2% Al, 0.9% Co (by weight) with the rest of ingredient being Fe and unavoidable impurities is melted by a high-frequency melting process into a molten. The molten is maintained at 1,350° C., and then quenched on a single roll. Cooling conditions at this time include a roll peripheral speed of about 1 m/s, a cooling rate of 500° C./sec, and a sub-cooling of 200° C. The above quenching process yields an ingot of flaky alloy having a thickness of about 0.3 mm. It should be noted here that the cooling rate in the quenching method may be $10^{2°}$ C./sec~$10^{4°}$ C./sec.

The obtained alloy ingot is coarsely pulverized by a hydrogen occlusion method, and then finely milled into an alloy powder having an average grain diameter(median diameter) of about 3.5 $\mu$mm by a jet mill in a nitrogen atmosphere.

Such a rare-earth alloy powder as above is added with a lubricant. In this case, fatty acid ester is used as the lubricant, and a petroleum solvent is used as a solvent for example. The fatty acid ester diluted with the petroleum solvent is added by the amount of 0.3 weight % (lubricant base) of the rare-earth alloy powder, and mixed, coating powder grain surface with the lubricant.

Figure 4:
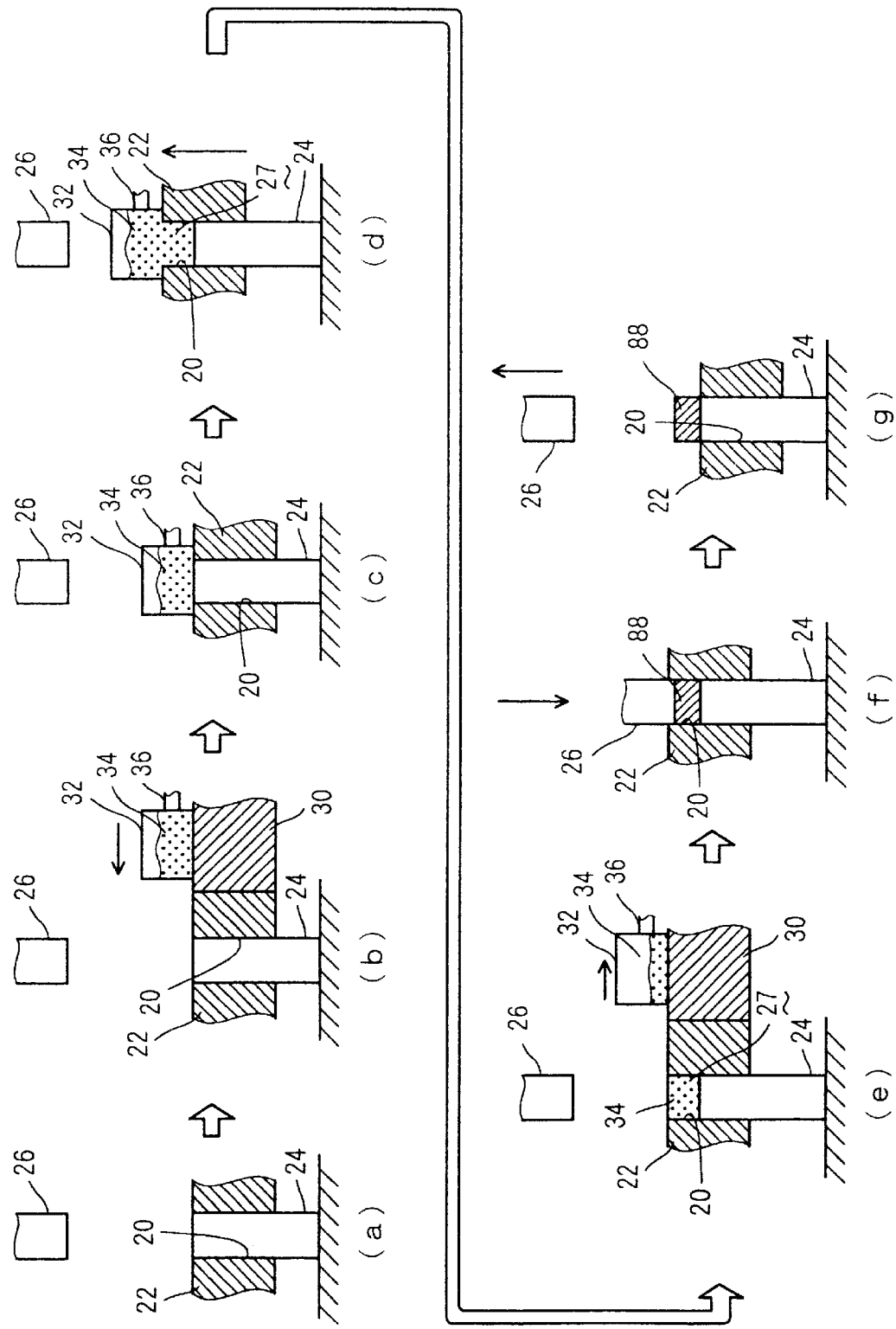
FIG. 4 is a schematic diagram showing a sequence of operation of the embodiment shown in FIG. 1.

Next, operation of the powder pressing apparatus 10 will be described with reference to FIG. 4.

A first sate is a state in which a previous cycle of the pressing operation is completed. As shown in FIG. 4(a), the die 22 stays at an end of its downstroke while the upper punch 26 stays at an end of its upstroke. Then, as shown in FIG. 4(b), the feeder box 32 is slid toward the through hole 20. The feeder box 32 is stopped right above the through hole 12 as shown in FIG. 4(c). Thereafter, as shown in FIG. 4(d), the die 22 begins rising to form the cavity 27 in an upper portion of the through hole 20, allowing the powder 34 held in the feeder box 32 to fall into the cavity 27.

Next, as shown in FIG. 4(e), when the die 22 reaches an end of its upstroke, the feeder box 32 is evacuated from above the cavity 27, wiping the powder 34 by a bottom edge of the feeder box 32.

Then, as shown in FIG. 4(f), the upper punch 26 is lowered into the through hole 20 (the cavity 27). The powder 34 within the cavity 27 is oriented by the magnetic field and the powder 34 is pressed by the upper punch 26 and the lower punch 24, into the compact 88.

When the pressing is complete, as shown in FIG. 4(g), the upper punch 26 is raised while the die 22 is lowered, to take out the compact 88.

Figure 5:
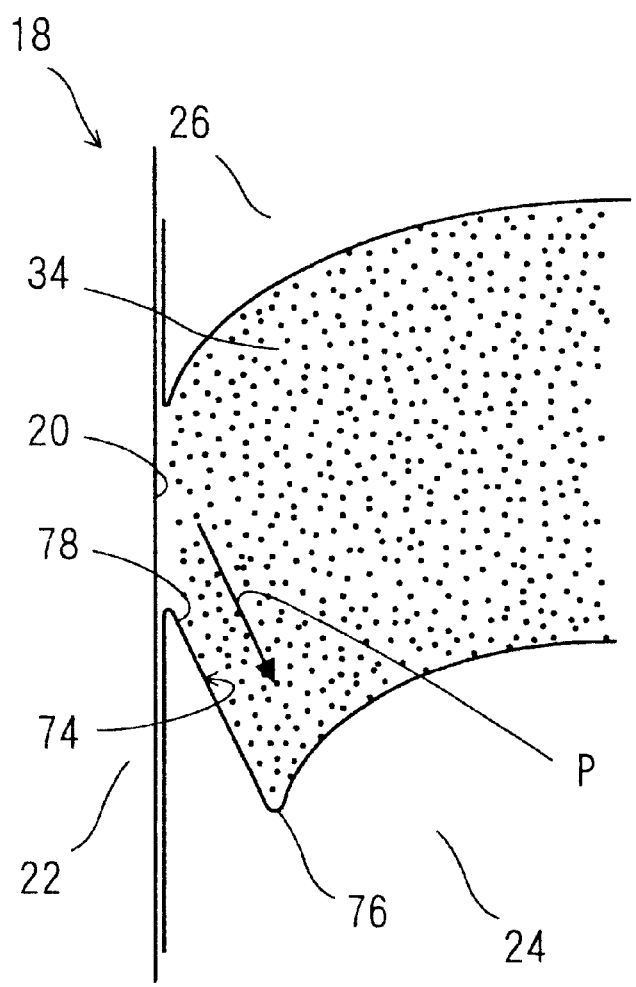
FIG. 5 is a schematic diagram showing a primary portion for description of a state of compression of a powder in a tolling.

Now, reference is made to FIG. 5 for description of a state in the cavity 27 at the time of pressing shown in FIG. 4(f).

As shown in FIG. 5, the upper punch 26 and the lower punch 24 are inserted in the through hole 20 of the die 22 from above and below respectively. The powder 34 is pressed by the die 22, the upper punch 26 and the lower punch 24. At this time, the magnetic filed having the strength not smaller than 0.5 MA/m is applied in a direction vertical to a plane of the document in FIG. 5, i.e. in a direction vertical to the directions of pressing by the upper and lower punches 26, 24, in a longitudinal direction of the compact 88 (longitudinally of the projection 74) as indicated by an arrow C in FIG. 6. This increases the powder density above the projection 74 than in a central portion of the cavity 27.

As shown by an arrow P in FIG. 5, the powder 34 above the projection 74 moves toward the groove 76 with the downward movement of the upper punch 26.

At this time, the tip 78 of the projection 74, formed to have the chamfering width h of not greater than 0.5 mm, increases fluidity(flowability) of the powder 34, allowing the powder 34 above the projection 74 to move down smoothly along the surface of the projection 74 without stagnating above the projection 74. Especially, since the projection 74 is treated so as to have the surface roughness Ra not greater than 1.0 μm, it becomes possible to move down the powder 34 smoothly along the projection 74. Therefore, it becomes possible to make uniform density distribution of the powder 34 especially near the projection 74 including the tip 78. As a result, the compact 88 having a uniform density can be obtained, making possible to prevent the cracks and fractures caused by non-uniform density distribution.

Therefore, even if the flowability of the rare-earth alloy powder is decreased by the addition of the lubricant, or if the flowability of the rare-earth alloy powder is very poor as a result of manufacture by the quenching method, the uniformity of compact density can be improved.

Further, difference in the density of the powder 34 in the cavity 27 can be reduced even if the powder 34 is oriented by the magnetic field not smaller than 0.5 MA/m.

Figure 6:
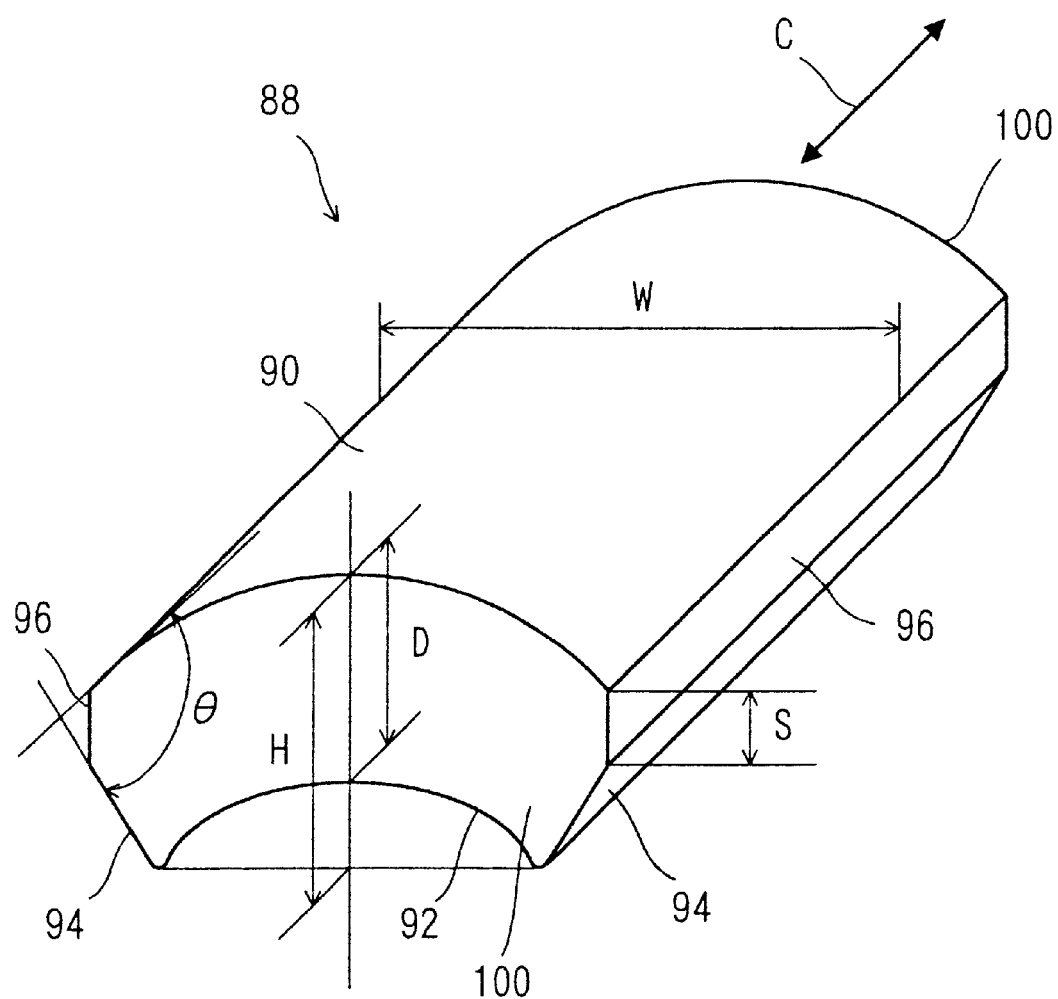
FIG. 6 is a perspective view showing a compact.

FIG. 6 shows the compact 88 formed as described above.

The compact 88 is formed into a shape having a generally arcuate section, and include a convex upper surface 90, a concave lower surface 92, slopes 94 rising upwardly from two edges of the lower surface 92 respectively, side surfaces 96 formed between respective pairs of an edge of the upper surface 90 and an edge of the slope 94, and generally arcuate end surfaces 100.

The upper surface 90 is formed by the punching surface 86 of the upper punch 26. The lower surface 92 is formed by the projection 72 of the punching surface 70 of the lower punch 24. The slope 94 is formed by the projection 74 of the punching surface 70 of the lower punch 24. Each of the side surfaces 96 and the end surfaces 100 is formed by the wall of the through hole 20 of the die 22.

As has been understood from the above description made with reference to FIG. 5, the density distribution of the powder 34 is made uniform around the side surface 96.

Figure 16:
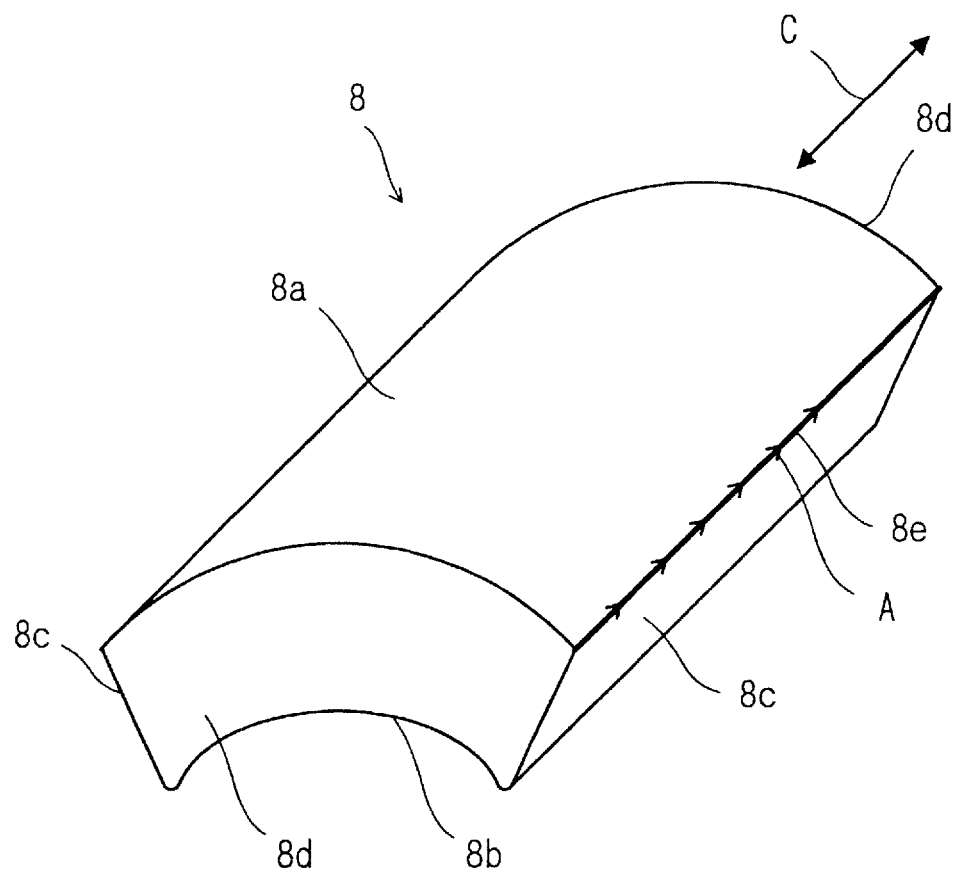
FIG. 16 is a perspective view showing a prior art compact.

Therefore, differing from a conventional compact 8 shown in FIG. 16, in which the density distribution is non-uniform, development of a crack A is virtually eliminated.

Further, by controlling the density of the compact 88 after the pressing to be 3.90 g/cm$^3$~4.60 g/cm$^3$, necessary strength of the compact 88 can be achieved, and a rare-earth magnet having a good magnetic characteristic can be obtained. If the density is not greater than 3.90 g/cm$^3$, the strength of the compact 88 is too small for easy handling. On the other hand, if the density is not smaller than 4.60 g/cm$^3$, compression rate of the compact 88 is too high, disturbing the magnetic orientation.

Figure 7:
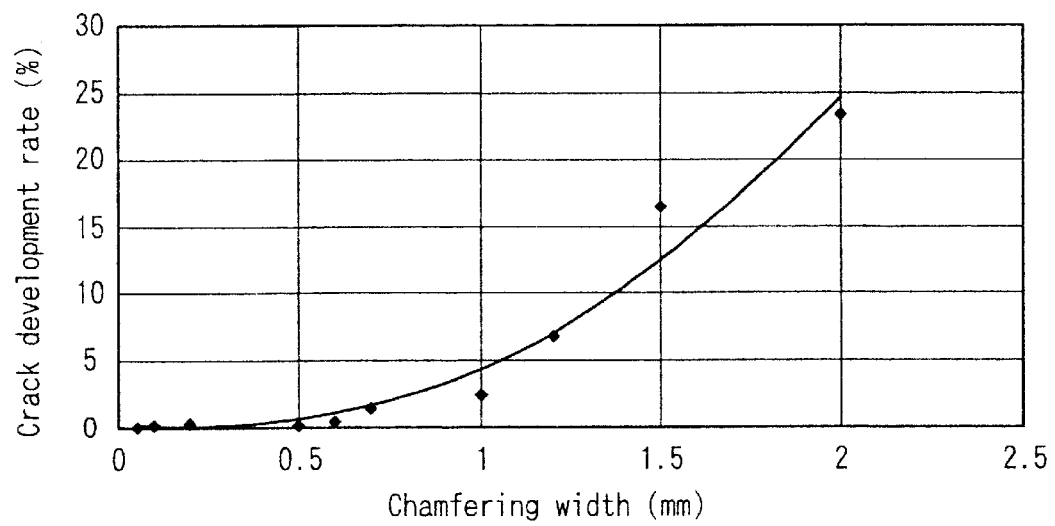
FIG. 7 is a graph showing relationships between a chamfering width h and a rate of crack development.

Next, FIG. 7 shows a result of experiment indicating relationships between the chamfering width h of both punches and a rate of crack development.

In this experiment, the upper surface 90 had a width w of 52.22 mm, and a height H to the highest point of the upper surface 90 was 30.2 mm. The compact 88 had a thickness D of 25.04 mm, and the side surface 96 had a width S of 7.55 mm. The surface roughness Ra of the projection 74 of the punching surface 70 was 0.033 μm. The rare-earth alloy powder having an average grain diameter(median diameter) of 3.5 μm was used as the powder 34, and the compact density after the pressing was 4.1 g/cm$^3$.

The crack development rate when the chamfering width h was between 0.05 mm~0.50 mm averaged at 0.2%. When the chamfering width h was 0.60 mm, the crack development rate was 0.4%, and when the chamfering width h was 0.70 mm, the crack development rate was 1.43%. When the chamfering width h was 1.0 mm, the crack development rate was 2.36%.

Therefore, the chamfering width h is preferably not greater than 0.50 mm. Further, since the crack development rate with the chamfering width h of 0.10 mm was 0.1% and the crack development rate with the chamfering width h of 0.05 mm was 0%, the chamfering width h is more preferably not greater than 0.10 mm, and even more preferably, not greater than 0.05 mm.

Figure 8:
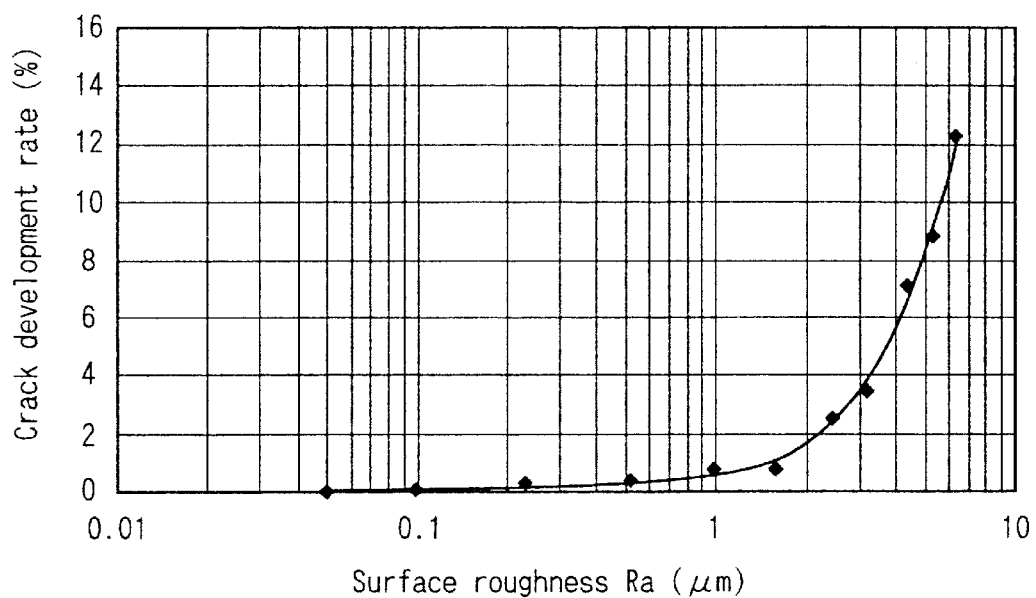
FIG. 8 is a graph showing relationships between a surface roughness Ra and the rate of crack development.

Further, FIG. 8 shows a result of experiment indicating relationships between the surface roughness Ra and the crack development rate.

In this experiment, the upper surface 90 had a width W of 52.22 mm, and a height H to the highest point of the upper surface 90 was 30.2 mm. The compact 88 had a thickness D of 25.04 mm, and the side surface 96 had a width S of 7.55 mm. The chamfering width h of both punches was 0.05 mm. The rare-earth alloy powder having an average grain diameter of 3.5 μm was used as the powder 34, and the compact density after the pressing was 4.1 g/cm$^3$.

The crack development rate when the surface roughness Ra was between 0.05 μm~0.52 μm was not greater than 0.4%. When the surface roughness Ra was 1.00 μm, the crack development rate was 0.8%. However, when the surface roughness Ra exceeds 1.00 μm, the crack development rate increases rapidly: for example, when the surface roughness Ra was 2.45 μm, the crack development rate was 2.5%, and with the surface roughness Ra of 3.18 μm, the crack development rate was 3.5%.

Therefore, the surface roughness Ra is preferably not greater than 1.00 μm. Further, the surface roughness Ra is more preferably not greater than 0.52 μm.

Figure 9:
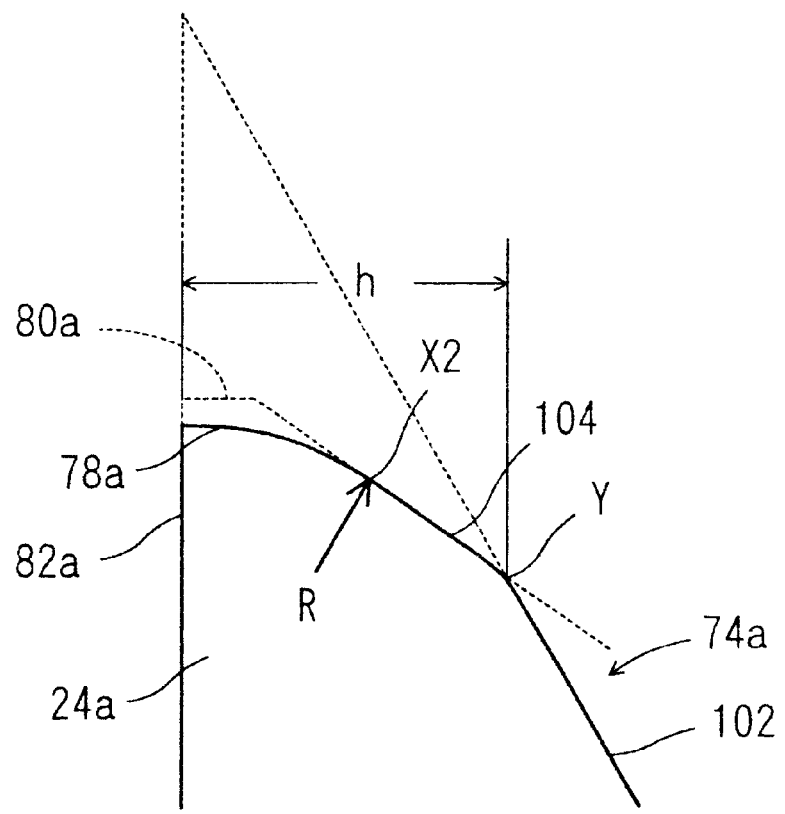
FIG. 9 is a side view showing a primary portion of the projection in the punching surface of the lower punch as a variation.

It should be noted here that a lower punch 24a having a projection 74a in place of the projection 74 as shown in FIG. 9 may be used.

According to the projection 74a of the lower punch 24a, a flat portion 104 that is less steep than the flat portion 102 is formed between a chamfered curvy tip 78a and a sloped flat portion 102.

In this case, a portion close to the tip of the projection 74a is first machined to form the flat portion 104. A broken line 80a in FIG. 9 indicates the tip of the projection 74a after the formation of the above flat portion 104 and before the chamfering operation. By chamfering the tip indicated by the broken line 80a, the curvy tip 78a having a radius R is formed.

According to the projection 74a, a border X2 is a border between the tip 78a and the flat portion 104, whereas a border Y is a border between the two flat portions 104 and 102.

The chamfering width h is a minimum distance from the border Y to a punch side surface 82a, i.e. a minimum distance from a starting point of chamfering to the punch side surface 82a. According to the present embodiment, the chamfering width h is not greater than 0.5 mm. Further, the chamfering width h is more preferably not greater than 0.2 mm.

According to the present embodiment, by providing the flat portion 104, the chamfering width h can be further decreased.

It should be noted here that connection between the flat portions 102 and 104 should preferably be made smooth and curvy by chamfering a portion of the border Y. Further, a curved portion may be formed in place of the flat portion 104.

Figure 10:
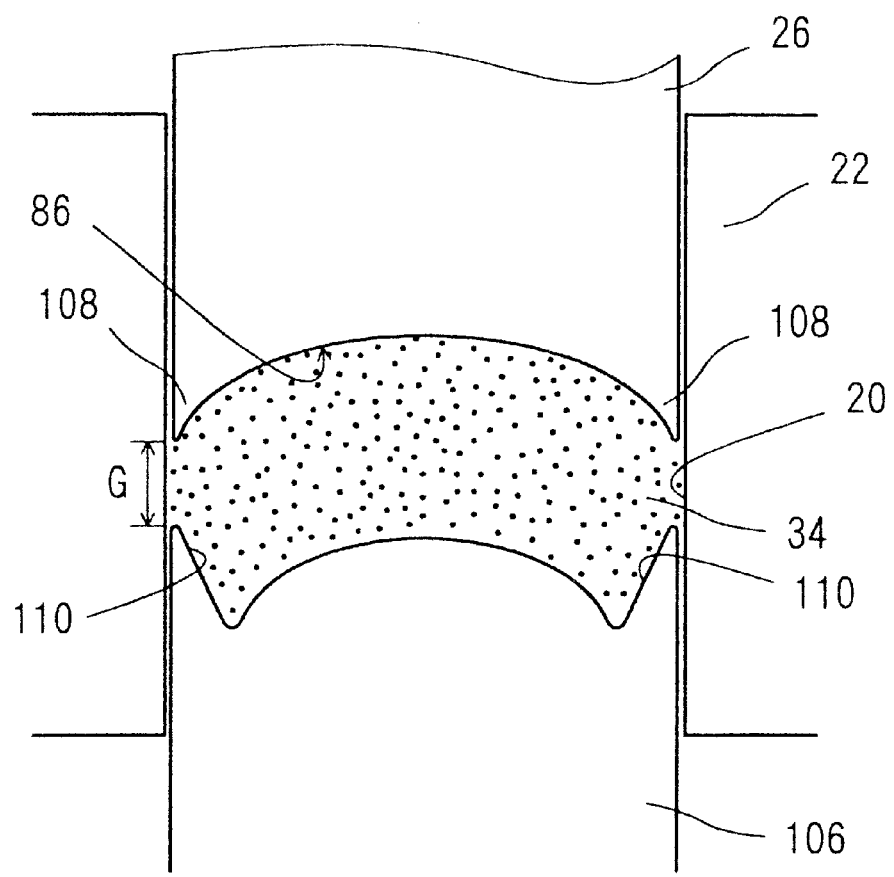
FIG. 10 is a sectional side view showing a primary portion of the upper and lower punches brought closest to each other according to another embodiment of the present invention.

Next, reference is made to FIG. 10 for description of another embodiment of the present invention.

In this embodiment, a conventional lower punch 106 having a chamfering width h greater than 0.5 mm is used. Other constitutions are the same as in the powder pressing apparatus 10.

At the time of pressing the powder 34, a minimum distance when the upper punch 26 and the lower punch 106 are brought closest to each other is not smaller than 2 mm. Specifically, as shown in FIG. 10, a gap G between the edge 108 of the upper punch 26 and the projection 110 of the lower punch 106 when the two punches are brought closest to each other is at least not smaller than 2 mm.

Therefore, the width S of the side surface 96 of the obtained compact 88 is not smaller than 2.0 mm. Further, S/H is preferably not smaller than 0.15.

The compact 88 is sintered thereafter for an hour at 1,000° C.~1200° C. in an argon atmosphere as disclosed in the paragraph 10(4) of the U.S. Pat. No. 4,792,368, yielding a sintered body. The side surface width of the sintered boy becomes not smaller than 1.7 mm, and at this time, S/H of the sintered body is substantially the same as S/H of the compact 88.

As described above, by forming the side surface 96 having the width S not smaller than 2 mm in the compact 88, extreme increase in the density in the side surface 96 can be avoided, thereby lessening the density difference from other portions. Thus, the cracks and fractures in the side surface of the compact 88 can be reduced.

By using such a sintered body as described above, yield in manufacturing process can be improved and productivity is increased in the manufacture of the rare-earth magnet.

Further, by leaving the side surface 96 between the slope 94 and the upper surface 90 of the compact 88 during the pressing, it becomes possible to use the side surface 96 as a reference surface in shaping, polishing and to a final step of machining.

Further, the sintered body which is less susceptible to the crack can be obtained, and by using such a sintered body, a voice coil motor having a stable quality can be obtained.

The voice coil motor referred to herein is used for example in a disk drive as disclosed in FIG. 9 of the U.S. Pat. No. 5,448,437. According to the above FIG. 9, the voice coil motor is indicated by a reference number 37. The compact 88 shown in FIG. 6 of the present application is sintered, then sliced in parallel to the end surface 100, and surface-treated. The rare-earth magnet thus produced is used for example as a magnet indicated by reference numbers 3, 4, 5 and 6 in FIGS. 1 and 2 of the U.S. Pat. No. 5,448, 437.

Figure 12:
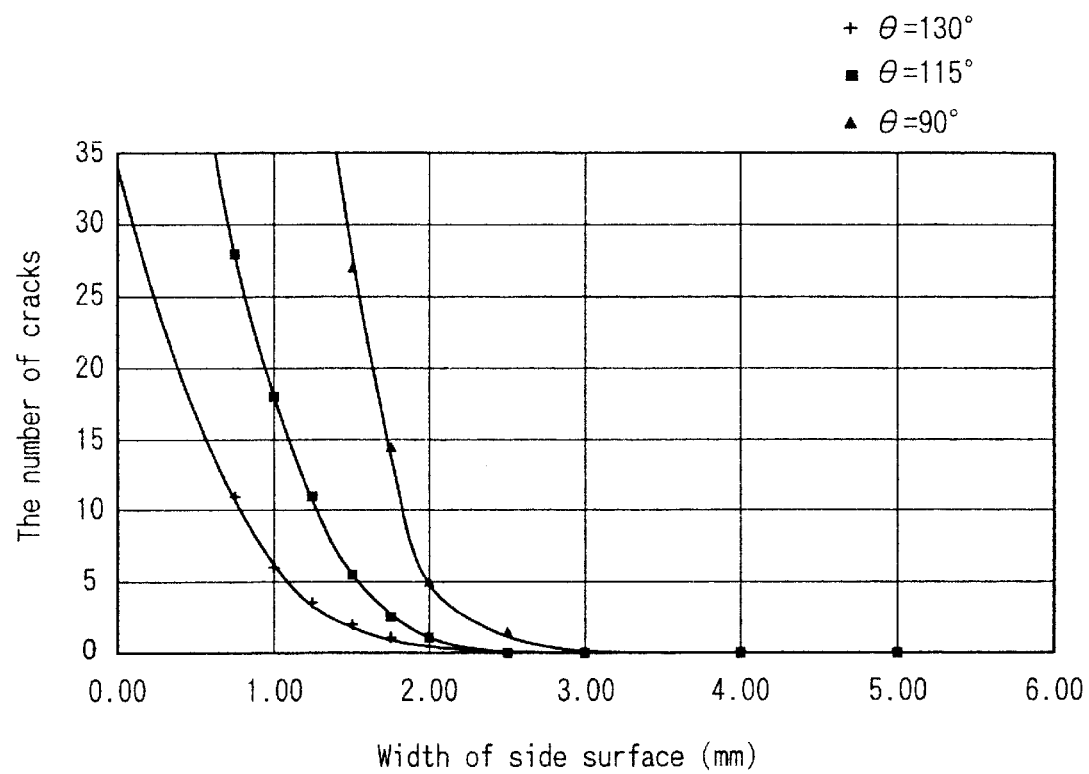
FIG. 12 is a graph showing an example of relationships between a width S of the side surface and the number of cracks.

Next, reference is made to FIG. 11 and FIG. 12 for description of results of experiments conducted by the powder pressing apparatus using lower punch 106.

The experiment used the rare-earth alloy powder added with the above described lubricant made from the fatty acid ester. The rare-earth alloy powder was oriented in the magnetic field of 1.0 MA/m, and pressed to a green density of 4.0 g/cm$^3$~4.2 g/cm$^3$. Two compacts were made, and the number of cracks developed on the side surfaces 96 in each of the compacts 88 was counted and averaged. The average was given as "the number of cracks".

FIG. 11 shows relationships between the dimensional ratio S/H and the number of cracks. The experiment was made under two settings; with an angle θ (see FIG. 6) made by the upper surface 90 and the slope 94 being 95 degrees and 120 degrees. The compact 88 used in the experiment had a width W of 53.32 mm, the upper surface 90 with a curvature radius of 37.58 mm, the lower surface 92 with a curvature radius of 17.55 mm, and the length of the compact 88 in the direction of orientation of 80 mm. In this experiment, the chamfering width was 0.05 mm for each of the upper punch 26 and the lower punch 106 and the surface roughness Ra of the slope is 0.033 μm.

As shown in FIG. 11, there is virtually no crack development if the dimensional ratio S/H is not smaller than 0.15. With the dimensional ratio S/H exceeding 0.2 there was actually no crack development, except the case in which the angle θ is 95 degrees.

FIG. 12 shows relationships between the width S of the side surface 96 and the number of cracks. The experiment was made under three settings; with the angle θ being 90 degrees, 115 degrees and 130 degrees. The compact 88 used in the experiment had the width W of 33.57 mm, the upper surface 90 with a curvature radius of 20.84 mm, the lower surface 92 with a curvature radius of 13.27 mm, and the length of the compact 88 in the direction of orientation of 80 mm. In this experiment, the chamfering width was 0.8 mm for each of the upper punch 26 and the lower punch 106 and the surface roughness Ra of the slope is 0.033 μm.

As shown in FIG. 12, there is virtually no crack development if the width S is not smaller than 2 mm. With the width S not smaller than 3 mm, there was actually no crack development.

Further, experiment similar to those summarized in FIG. 10 and FIG. 12 was conducted using the powder pressing apparatus 10 having the lower punch 24 with the chamfering width h being 0.05 mm. Except for the use of the lower punch 24, the experiment was made under the same conditions as those summarized in FIG. 10 and FIG. 12, and a result shown in FIG. 13 was obtained.

Figure 13:
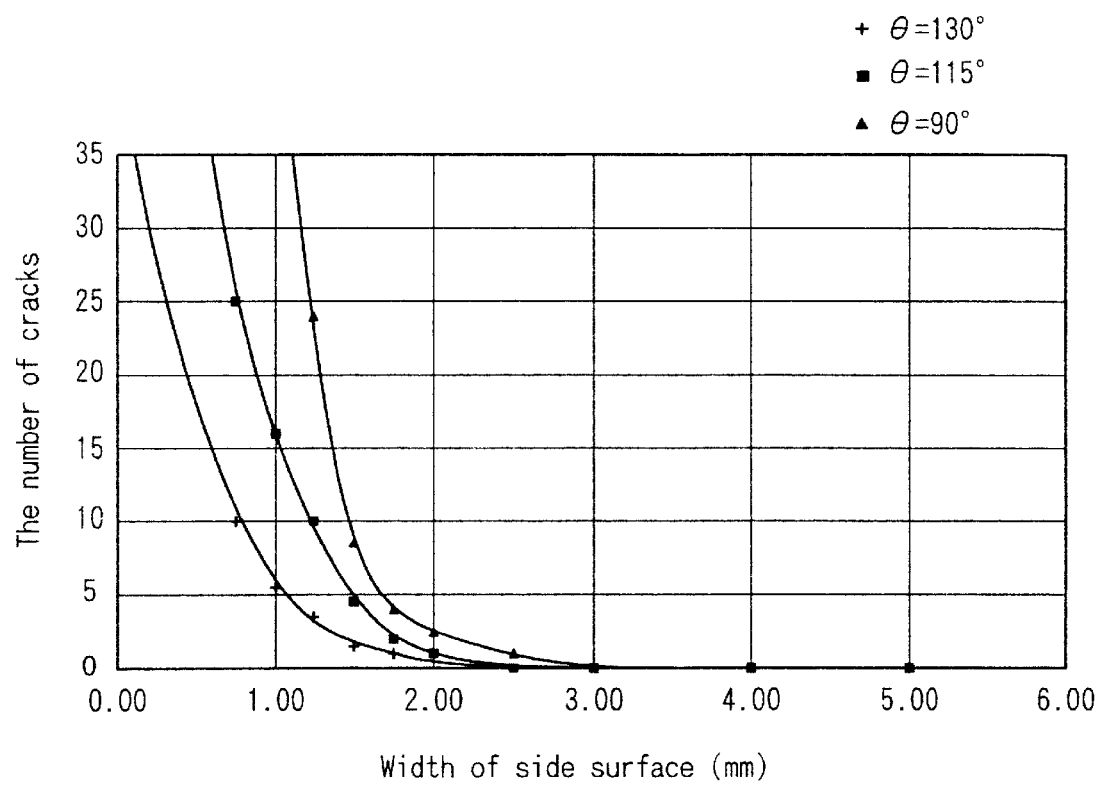
FIG. 13 is a graph showing another example of relationships between the width S of the side surface and the number of cracks.
Figure 14:
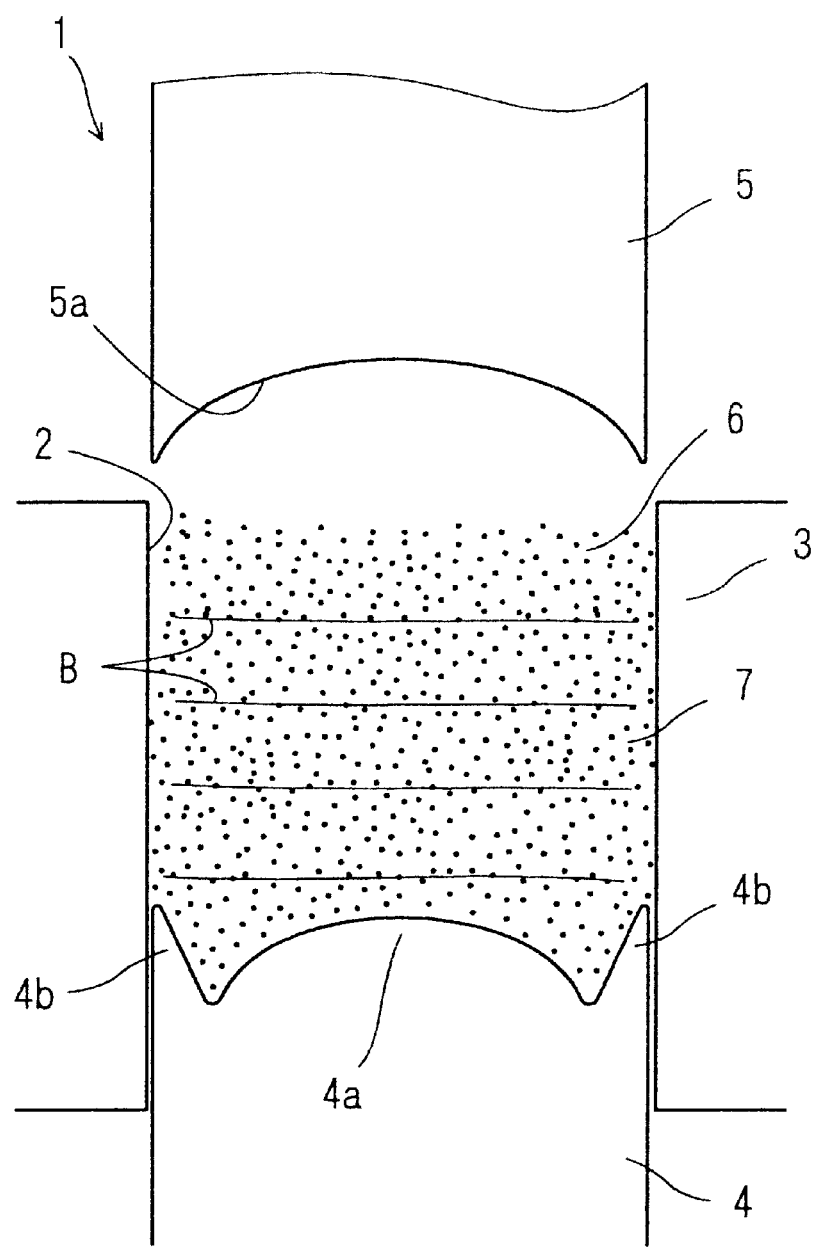
FIG. 14 is sectional side view of a primary portion showing a state in the tolling before pressing according to a prior art.
Figure 15:
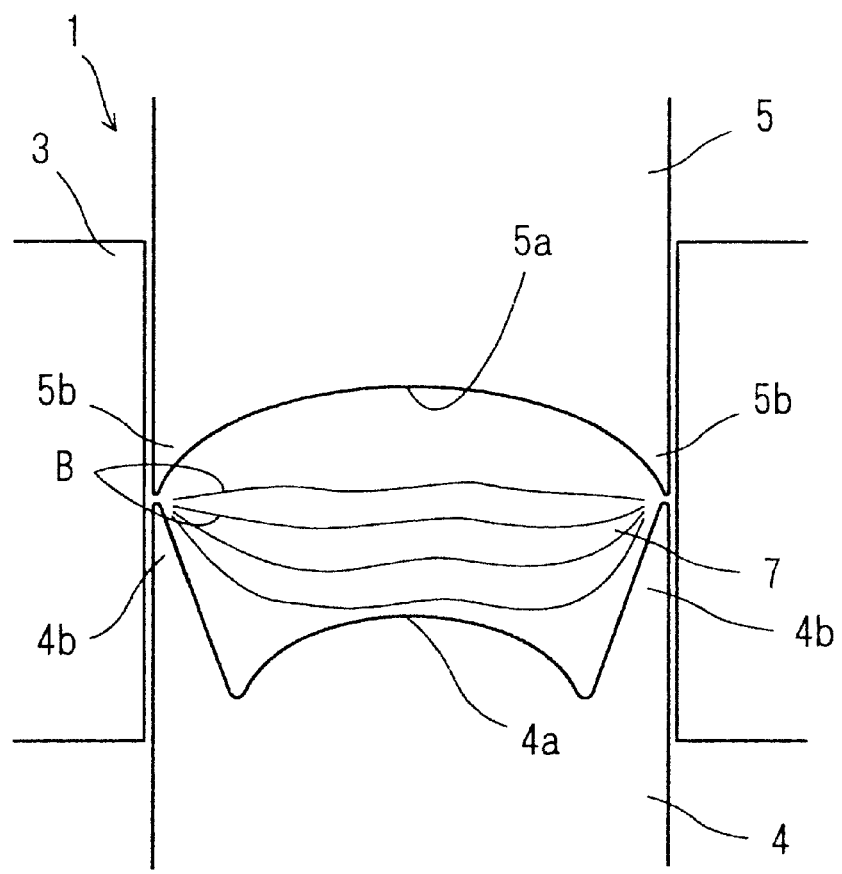
FIG. 15 is a sectional side view showing a primary portion of the upper and lower punches brought closest to each other according to the prior art.

FIG. 13 shows relationships between the width S of the side surface 96 and the number of cracks.

As shown in FIG. 13, there is virtually no crack development if the width S is not smaller than 1.7 mm. With the width S not smaller than 3 mm, there was actually no crack development.

As has been exemplified as above, the width S can be further reduced if the powder pressing apparatus 10 provided with the lower punch 24 having the chamfering width h of not greater than 0.5 mm is used. Therefore, the minimum distance between the upper punch 26 and the lower punch 24 brought closest to each other, i.e. the gap between an edge 108 of the upper punch 26 and the projection 74 of the lower punch 24 when the two punches are brought closest to each other can be made not smaller than 1.7 mm.

For a reference, if the compact 88 having the side surface 96 of the width S being 1.7 mm is sintered, the width of the side surface of the sintered body becomes 1.45 mm.

It should be noted here that the projection 74 of the lower punch 24 should be formed longitudinally of the punching surface 70, at least partially thereof.

Further, at least one of the upper punch and the lower punches should have the chamfering width h not greater than 0.05 mm.

The present invention being thus far described and illustrated in detail, it is obvious that these description and drawings only represent an example of the present invention, and should not be interpreted as limiting the invention. The spirit and scope of the present invention is only limited by words used in the accompanied claims.

What is claimed is:

1. A compact made of a rare-earth alloy powder made by a quenching method, comprising:
   a main surface formed convex;
   another main surface formed concave;
   a slope from an edge of said another main surface; and
   a side surface having a width not smaller than 1.7 mm fortified between said main surface and the slope.

2. A compact made of a rare-earth alloy powder made by a quenching method, comprising:
   a main surface formed convex;
   another main surface formed concave;
   a slope from an edge of said another main surface; and
   a side surface formed between said main surface and the slope,
   wherein said main surface has a maximum height H, the side surface having a width S, with S/H being not smaller than 0.15.

3. The compact according to claim 1 or 2, wherein the quenching method is a strip cast process.

4. The compact according to claim 1 or 2, wherein a cooling rate in the quenching method is $10^{2\circ}$ C./sec~$10^{4\circ}$ C./sec.

5. A sintered body made of a rare-earth alloy powder made by a quenching method, comprising:
   a main surface formed convex;
   another main surface formed concave;
   a slope from an edge of said another main surface; and
   a side surface having a width not smaller than 1.45 mm formed between said main surface and the slope.

6. A sintered body made of a rare-earth alloy powder made by a quenching method, comprising:
   a main surface formed convex;
   another main surface formed concave;
   a slope from an edge of said another main surface; and
   a side surface formed between said main surface and the slope,
   wherein said main surface has a maximum height H, the side surface having a width S, with S/H being not smaller than 0.15.

7. The sintered body according to claim 5 or 6, wherein the quenching method is a strip cast process.

8. The sintered body according to claim 5 or 6 wherein a cooling rate in the quenching method is $10^{2\circ}$ C./sec~$10^{4\circ}$ C./sec.

9. A voice coil motor using a sintered body of a rare-earth alloy powder made by a quenching method, the sintered body comprising: a main surface formed convex; another main surface formed concave; a slope from an edge of said another main surface; and a side surface having a width not smaller than 1.45 mm formed between said main surface and the slope.

10. A voice coil motor using a sintered body of a rare-earth alloy powder made by a quenching method, the sintered body comprising: a main surface formed convex; another main surface formed concave; a slope from an edge of said another main surface; and a side surface formed between said main surface and the slope; said main surface having a maximum height H, the side surface having a width S, with S/H being not smaller than 0.15.

11. The voice coil motor according to claim 9 or 10, wherein the quenching method is a strip cast process.

12. The voice coil motor according to claim 9 or 10, wherein a cooling rate in the quenching method is $10^{2\circ}$ C./sec~$10^{4\circ}$ C./sec.

* * * * *

UNITED STATES PATENT AND TRADEMARK OFFICE
CERTIFICATE OF CORRECTION

PATENT NO. : 6,755,883 B2
DATED : June 29, 2004
INVENTOR(S) : Seiichi Kohara et al.

It is certified that error appears in the above-identified patent and that said Letters Patent is hereby corrected as shown below:

Title page,
Item [*] Notice, should read -- Subject to any disclaimer, the term of this patent is extended or adjusted under 35 U.S.C. 154(b) by 135 days. --

Signed and Sealed this

Eighth Day of February, 2005

JON W. DUDAS
*Director of the United States Patent and Trademark Office*